United States Patent

[11] 3,526,185

| [72] | Inventor | Gerhard Schwarz<br>Munich, Germany |
|---|---|---|
| [21] | Appl. No. | 648,279 |
| [22] | Filed | June 23, 1967 |
| [45] | Patented | Sept. 1, 1970 |
| [73] | Assignee | Compur-Werk Gesellschaft mit<br>beschrankter Haftung and Co.<br>Munich, Germany |
| [32] | Priority | July 20, 1966 |
| [33] | | Germany |
| [31] | | No. C39654 |

[54] PHOTOGRAPHIC SHUTTER HAVING TWO BLADE DRIVING MEMBERS
2 Claims, 5 Drawing Figs.

| [52] | U.S. Cl. | 95/63 |
|---|---|---|
| [51] | Int. Cl. | G03b 9/24 |
| [50] | Field of Search | 95/63 |

[56] References Cited
UNITED STATES PATENTS

| 3,165,996 | 1/1965 | Kiper | 95/64 |
| 3,187,654 | 8/1965 | Starp | 95/63 |
| 3,302,544 | 2/1967 | Kiper | 95/60 |
| 3,373,672 | 3/1968 | Ichijo | 95/63 |
| 2,890,640 | 6/1959 | Noack | 95/63 |
| 3,164,077 | 1/1965 | Mulats | 95/63 |

*Primary Examiner*—John M. Horan
*Attorney*—Larson and Taylor

ABSTRACT: A photographic shutter having blades for covering a light aperture and two spring loaded blade driving members, whereby rundown movement of the first driving member effects opening of the light aperture and rundown movement of the second driving member, after an electronically adjustable delay period, effects closing of the aperture, the two rundown movements proceeding at approximately the same rate of speed. A double-armed abutment lever, pivotally mounted in the shutter, limits the distance of the rundown movement of the two blade driving members and is movable under the influence of a cocking lever to cock the two driving members. An adjustable setting ring mounted on the outside of the shutter is connected to a cam to determine the distance of rundown movement permitted by the abutment lever.

PHOTOGRAPHIC SHUTTER HAVING TWO BLADE DRIVING MEMBERS

BACKGROUND FIELD OF THE INVENTION

This invention relates to a photographic shutter for use with a camera and is of the type having shutter blades to close the shutter light aperture and two spring biased blade driving members which are adapted to unwind, that is, rundown, in succession from a cocked condition to a rest condition. The rundown movement of the first driving member is arranged to effect opening of the light aperture and the rundown movement of the second driving member is arranged to effect closing of the aperture. In shutters of this type it is possible to determine both the period of exposure and the size of the light aperture.

SUMMARY OF THE INVENTION

It is an object of the present invention, in shutters of this type, to provide an arrangement whereby, first, the period of exposure and the shutter aperture can be adjusted independently of one another, and second, the setting of one of these two factors has no detrimental effect on the setting of the other. This object is met in the present invention by the fact that the rate of rundown movement of the two driving members is kept approximately the same, that the commencement of the rundown movement of the second driving member is adjustable relative to the commencement of the rundown movement of the first driving member by means of an adjustable delay mechanism, and the fact that an adjustable abutment member is provided for limiting the distance of the rundown movement of the two driving members.

Another object of the invention is to keep the number of constructional and operational elements of a shutter of this nature to a minimum and thereby achieve an economic, reliable, and readily usable compact shutter construction. This is achieved in accordance with the present invention by the fact that the abutment member is pivotable from its abutment position by an associated cocking element to set the two driving members in the cocked condition.

In accordance with a further and advantageous feature of the invention the abutment member is in the form of a double-armed lever pivotally mounted in the shutter, the first arm of which carries an abutment pin of the blade driving members while the other arm is held by a torsion spring against a setting cam portion of a setter. The cocking lever is pivotally mounted in the shutter co-axially in relation to the abutment lever and adapted to engage the abutment lever during the pivotal motion of the cocking lever and move the abutment lever to cock the blade driving members.

According to another feature of the invention the shutter includes a setting cam controlling the position of the abutment lever, the cam being connected to a setter in the form of a ring co-axial with the axis of the shutter aperture, the setting position of which is determined by a diaphragm scale and a marker associated therewith.

Thus, it is another object of this invention to provide a photographic shutter for use in controlling the light aperture of a camera wherein a pair of blade driving members which control the opening and closing of the shutter blades respectively are arranged to operate at the same rate of speed.

It is still another object of this invention to provide a photographic shutter having a pair of blade driving members which is more economical since an abutment lever serves the dual purpose of limiting movement of the blade driving members and returning the blade driving members to the cocked position.

Other objects and the attendant advantages of the present invention will become apparent from the detailed description to follow together with the accompanying drawings.

BRIEF DESCRIPTION OF THE DRAWINGS

There follows a detailed description of a preferred embodiment of the invention to be read together with the accompanying drawings. However, it is to be understood that the detailed description and the accompanying drawings are intended solely to illustrate the preferred embodiment of the invention and that the invention is capable of numerous modifications and variations apparent to one skilled in the art without departing from the spirit and scope of the invention as defined in the claims.

In the drawings.

DESCRIPTION OF THE PREFERRED EMBODIMENT

Figure 1:
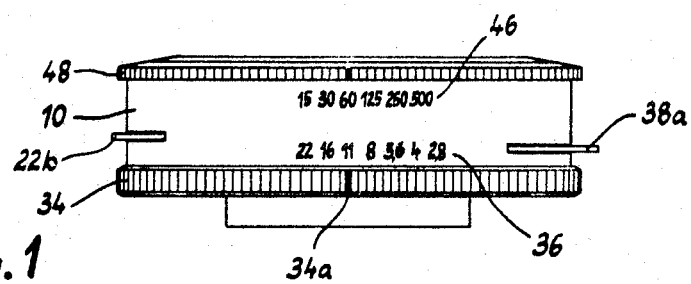
- FIG. 1 is a front elevation view of the shutter.

Referring now to the drawings, there is shown a plurality of shutter blades 12 arranged in a shutter housing 10, each of these blades being supported on a mounting pin 14a of a first blade driving ring 14 which is rotatably mounted around the objective tube 10a of the shutter 10. Further, each blade 12 has a control slot 12a in which is engaged an operating pin 16a on a second blade driving ring 16. The ring 16 is also mounted for rotation around the objective tube 10a.

An axially projecting lug 16b of the ring 16 cooperates with the radial projection 14b of the ring 14. A spring 18 anchored at one end to the ring 16 and at the other end to the shutter housing biasses the ring 16 in the clockwise direction and the lug 16b into continuous engagement with the projection 14b. Also connected to ring 14 is an operating spring 20 which biasses ring 14 in the clockwise direction.

A trip member 22 is rotatably mounted in the shutter housing 10 and biassed in the clockwise direction by a torsion spring 24. The arm 22a of this trip member is thus disposed in front of the projection 14b on ring 14 and thereby determines the cocked condition of the two blade driving rings 14, 16. The other arm 22b of the trip member projects out of shutter housing 10. A double-armed abutment lever 28 is rotatably mounted on a bearing pin 26 affixed to the shutter housing 10. One arm of this lever carries a pin 28a serving as an abutment for arm 14c on ring 14. The other arm 28b of the abutment lever cooperates with a cam edge 30a of a setting ring 30 rotatably mounted in shutter housing 10. The part 28b is urged into engagement with surface 30a by a torsion spring 32. Setting ring 30 is coupled to a setting ring 34 which is rotatably mounted at the periphery of the shutter housing 10 and has an index marking 34a coacting with a scale 36 at the periphery of the shutter housing 10. A detent catch device, (not shown but of known form) may be associated with one of the rings 30, 34 to hold it against unintentional movement when it has been set to a chosen value on scale 36.

A cocking lever 38 is pivotally mounted on the bearing pin 26 below the abutment lever 28 and is loaded by a torsion spring 40 which urges it against a rest stop pin 41. The arm 38a of the cocking lever projects out of the shutter housing 10. The pin 38b of the cocking lever projects into the path of travel of the abutment lever 28 such that, when the lever 38 moves in the clockwise direction the pin 38b engages with abutment lever 28 and carries it along, also in the clockwise direction. The pin 28a of abutment lever 28 then bears against the arm 14c of the ring 14 and produces a counterclockwise movement of the latter from the rest position into the cocked position as shown in FIG. 1. When the blades are closed the ring 16 is also brought into the cocked condition through the agency of the coupling 14b, 16b.

The shutter is provided with an electronic regulating arrangement (known per se) for determining the duration of the exposure period. This arrangement, which is equipped with a battery and an R—C member, operates on the principle that, after release of the first blade driving member 14 by turning the trip member 22 counterclockwise and thus, during the opening of the shutter blades, the second blade driving ring 16 will remain locked until the expiry of the delay period of the electronic regulating arrangement, after which the locking means for ring 16 will be released. The delay period thus determines the duration of the exposure period.

Figure 3:
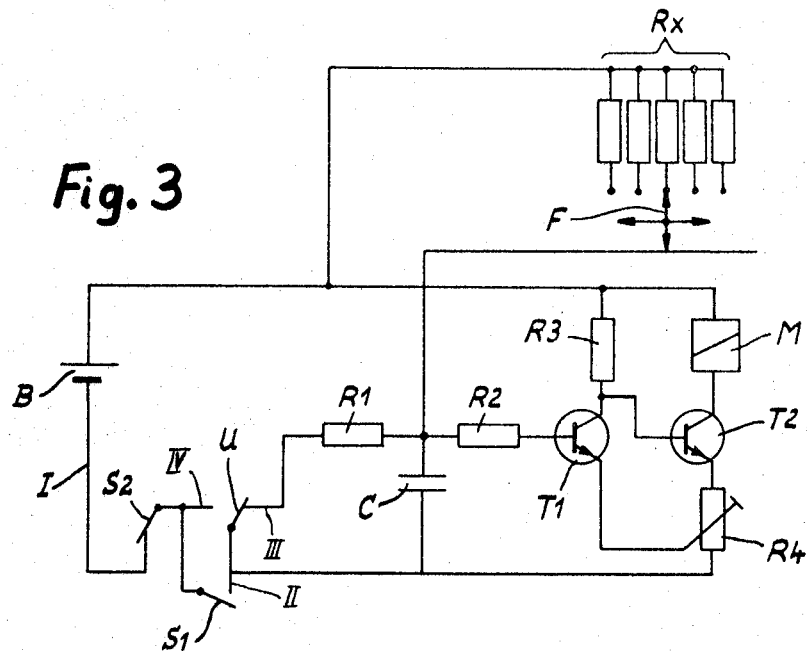
- FIG. 3 is a diagram of the connections in the electronic arrangement, embodied in this shutter, for controlling the time period.

The system of connections of the regulating arrangement is illustrated in FIG. 3. Current is fed from a battery B to charge the time-controlling condenser C through an adjustable electrical resistance Rx and limit resistance R1. The connections include a Schmitt trigger with transistors T1 and T2, a protective resistance R2, a collector resistance R3, and the magnetic spool of electromagnet M. R4 designates a setting potentiometer for adjusting the electronic regulating arrangement.

Switches S1 and S2, and a changeover member U are also included in the electrical connections in the manner indicated in the drawing. All these switches are in the form of contact springs and mounted in the shutter housing 10 in insulating holders. The switch S1 is operated from the trip 22, while switch S2 is controlled by a pin 16c of insulating material on the ring 16. An insulated pin 14d of ring 14 is associated with the changeover member U and is used for operating the same. The metallic armature of the magnet M is coupled to an arm 16d of the ring 16 in insulated fashion, while magnet M is secured in the shutter housing 10 through a plate 44 of insulating material (not shown).

It is also pointed out that the time control ring 48 which carries the rider F associated with the resistance Rx, is adjustable by means of an exposure period scale 46 at the periphery of the shutter housing 10. The electrical elements, the conductors by which they are connected, and the battery are disposed in the shutter housing. For example, these connections may be provided on a platform carrier of insulating material.

Figure 2:
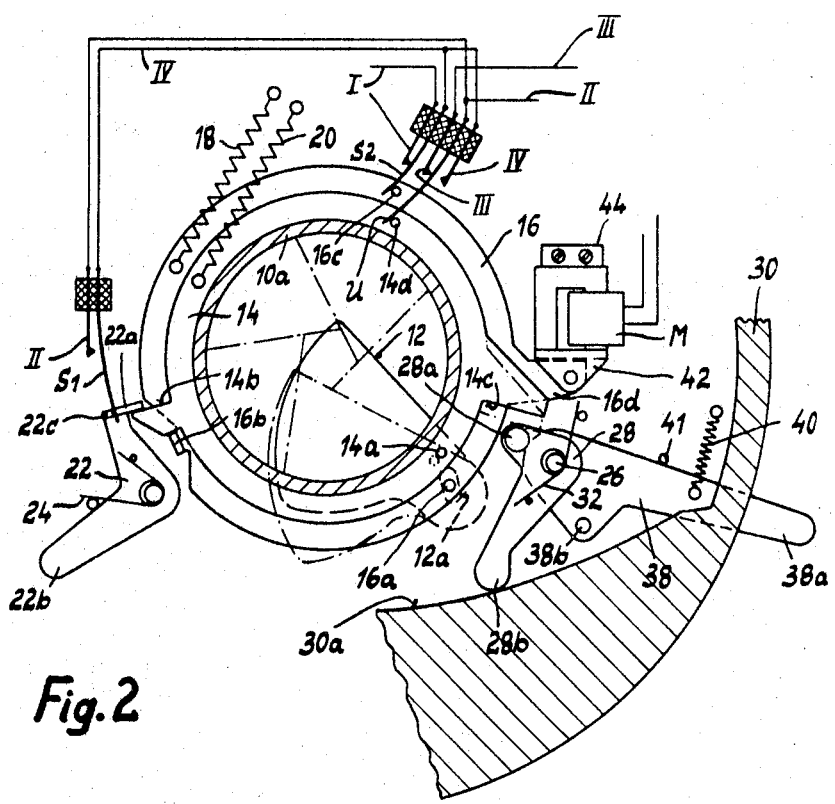
- FIG. 2 is a plan view of the parts of the shutter mechanism, on a larger scale than FIG. 1, and showing part of the shutter housing in cross-section.

The shutter described operates in the following manner:

It will be assumed that a specific resistance Rx, and thus a predetermined period of exposure (for example 1/60 second) has been set by means of the setter 48 and its rider F, and that the required shutter light aperture, for example 11, has been preselected by means of the setter 34. If the cocking lever 38 is now turned clockwise, the abutment lever 28 is moved out of the position it then occupies and the two blade driving rings 14, 16 are displaced in the counterclockwise direction from the rundown position to the cocked position shown in FIG. 1 with the blades 12 closed, in which the arm 22a of the trip member 22 engages behind the arm 14b of ring 14 and locks the two blade driving rings 14, 16 in the cocked condition. In this position the armature of blade ring 16 is applied against the magnet M which is still de-energized. The cocked condition of the shutter is illustrated in FIGS. 1—3. If the trip member 22 is now actuated, at the beginning of the release movement the switch S1, released by an insulated lug 22c of the member 22, connects the conductor II to the conductor I leading through closed switch S2 to the battery, whereby this battery B feeds current to the electronic regulating connections.

At the instant this switch-on takes place, the transistor T1 is fully blocked, so that the base of transistor T2 is applied through resistance R3 to battery B. The collector current flowing through transistor T2 energizes magnet M so that its armature 42 is held under the full power of the holding magnet M a short period after the moment of switch-on. The time-determining RC member of the regulating arrangement is not yet effective because the condenser C is still short circuited by the changeover switch U. As soon as the arm 22a of the trip member 22, in the course of the further movement of the latter, wholly releases the projection 14b of the first blade driving ring 14, this latter begins to run down in the clockwise direction under the influence of its driving spring 20, the blades 12 being pivoted in the counterclockwise direction through the pins 14a of this ring 14 and the light aperture of the shutter being opened. The second blade driving ring 16 remains held in its cocked position by the armature 42 and the energized magnet M.

The movement of the first blade driving member 14 is limited by engagement of arm 14c of the ring 14 with the pin 28a on the abutment lever 28. This limit position is dependent on the set position of the setter 30a and on the setting ring 34 which has been pre-selected by means of the scale 36. In this way the blades 12 are only brought as far as the open position indicated in dotted lines in FIG. 2, in which the size of the shutter light aperture corresponds to the pre-selected FIG. 11.

During the initial movement of the first blade driving ring 14 the changeover switch U is moved from conductor III to conductor IV by the pin 14d, as a result of which the time-controlling RC-member of the regulating arrangement becomes effective. A charging current begins to flow into condenser C through the manually-adjusted regulating resistance Rx and rider F, and this continues until the base of the transistor T1 exceeds its emission voltage. At this moment, the trigger rocks over and the transistor T1 becomes conductive, the transistor T2 being, on the other hand, fully blocked. Consequently, magnet M is de-energized and its armature 42 can drop away abruptly under the action of the fully-loaded spring 18 and thus release the second blade driving ring 16 to perform its rundown movement. This second ring 16 runs down until its lug 16b strikes the projection 14b of the first ring 14. During this rundown phase the blades 12 are pivoted back in the clockwise direction by the pin 16a of the ring 16 around the pins 14a (now stationary) of the first ring 14, so that the light aperture of the shutter is again fully closed. This means that the photograph has been taken with the preset duration of the exposure and with the preset light aperture opening.

Figure 4:
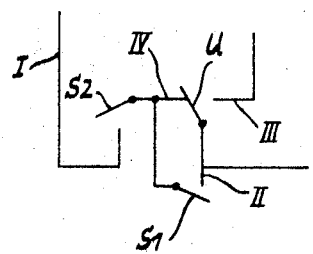
- FIG. 4 shows a switch, incorporated in the system of FIG. 3, in an alternative position.

In a rest position after the taking of a photograph, the switches S1, S2 and U occupy the positions illustrated in FIG. 4. Since the switch S2 is now open, the trip member 22 of the switch S1 can be closed by an inadvertent operation, the battery B cannot be coupled up to the regulating connections and unnecessarily discharged.

Figure 5:
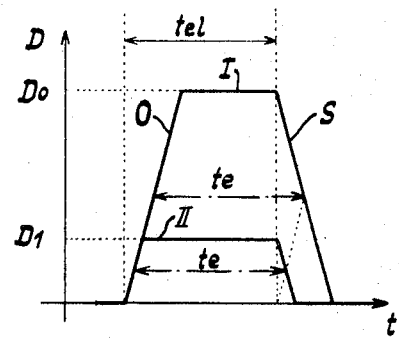
- FIG. 5 is a diagram illustrating the principles of operation of the shutter.

The blades, the two blade driving rings and their operating springs are so organized that the rate of speed of rundown of the first driving ring (opening ring 14) is either equal or approximately equal to the rate of speed of rundown of the second driving ring (closing ring 16). This condition has the advantage that —as shown by the shutter-opening diagram of FIG. 5—the flanking line O of the opening process is inclined at the same angle as the closing flank S. With the identity of time setting (tel), which follows from the uniform setting of the electrical regulating arrangement assumed above, the equivalent periods (te) are always constant irrespective of whether the shutter blades open fully (D0: Curve I) or whether the available light aperture is restricted to a very small diameter (D1: Curve II). Thus in such event the end points of the various equivalent periods (te) are always found on parallels to the opening flank O.

It is thus possible, with this arrangement according to the present invention, to select the duration of the period of exposure and the size of the light aperture completely independently of one another. On the other hand, without the provision of special expendients, the selection of the size of the light aperture can have no detrimental effect on the exposure period setting.

A further advantage of the arrangement according to the invention arises from the fact that the abutment lever 28 at the same time acts as a part of the cocking mechanism. This keeps the number of constructional and operational elements of the shutter down to a minimum. Moreover, an economical and compact shutter arrangement is achieved.

Although the invention has been described and illustrated in great detail with respect to a preferred embodiment thereof, it is to be understood that the invention is capable of numerous variations and modifications apparent to one skilled in the art without departing from the spirit and scope of the invention as defined in the appended claims.

I claim:
1. In a photographic shutter of the type having shutter blades covering a light aperture, first and second blade driving members arranged to rundown in succession from a cocked position to a rest position, the rundown movement of the first driving member being arranged to effect opening of the light aperture and the rundown movement of the second driving member being arranged to close the light aperture, the improvements including: delay means operable independently of the movement of said driving members for establishing the time of the delay period between commencement of the rundown movement of the first driving member and the commencement of the rundown movement of the second driving member, adjusting means for varying the time of said delay period, an abutment member mounted in said shutter for movement between a rest position where it limits the rundown movement of said driving members and a second position to cause cocking of said driving members, setting means for setting said abutment member in one of said different abutment positions, and means for controlling the rundown speed of the two driving members so that the rundown speed of the two driving members is kept approximately the same, a cocking lever mounted in said shutter in relation to the abutment member so that movement of the cocking lever causes movement of the abutment member from the said rest position to the said second position, wherein the abutment member is a double-armed lever, the first arm of which being positioned to engage the blade driving members while the other arm is positioned to be held by a resilient means against a setting cam on said setting means in the said rest position, and wherein the said cocking lever is mounted for pivotal movement co-axially in relation to the abutment lever and includes a driving pin engageable with the abutment lever as it causes movement of the abutment lever between the said rest position and the said second position to cock the blade driving members.

2. A photographic shutter according to claim 1 wherein the said setting means is a setting ring mounted on the outside of the shutter and rotatable about an axis coincident with the axis of the light aperture to adjust the distance of rundown movement of the blade driving members, the setter ring having a marker thereon which cooperates with a scale on the outside of the shutter to determine the setting of the said setting cam.